Oct. 21, 1958 | A. H. FAULKNER | 2,857,466

ELECTRONIC DISTRIBUTOR

Filed Dec. 1, 1953 | 2 Sheets-Sheet 1

INVENTOR.
ALFRED H. FAULKNER
BY Wm. Walter Owen,
ATTY.

Oct. 21, 1958 A. H. FAULKNER 2,857,466

ELECTRONIC DISTRIBUTOR

Filed Dec. 1, 1953 2 Sheets-Sheet 2

INVENTOR.
ALFRED H. FAULKNER
BY Mc Watters Owen
ATTY.

2,857,466
Patented Oct. 21, 1958

2,857,466

ELECTRONIC DISTRIBUTOR

Alfred H. Faulkner, Chicago, Ill., assignor to General Telephone Laboratories, Incorporated, a corporation of Delaware Application December 1, 1953, Serial No. 395,398
13 Claims. (Cl. 179—18)

This invention relates in general to electronic telephone systems and in particular to the employment of electronic circuits in a distributor to select an idle selector from a plurality of available selectors which may then be used to establish a connection between calling and called substations.

The present invention is an improvement over the electronic distributors used in the various proposed electronic telephone systems because of the use of simple operating circuits and the economical use of electronic components therein. The invention disclosed herein is an improvement over the distributor described in my "Electronic Telephone System" filed as application No. 211,950, on February 20, 1951 which issued on November 6, 1956 as Patent No. 2,769,865. The vacuum tube distributor described in the present application may be used in lieu of the gas tube distributor described in the afore-mentioned application provided that certain voltage modifications be made in the Electronic Telephone System. The gas tube distributor shown in Fig. 4 of application No. 211,950 is arranged to be operated by negative voltages on the Guard leads, such as 101. Since the vacuum tube distributor shown in Fig. 1 of the present application is designed to be operated by positive voltages on its "A" leads, such as 130A, the voltage supply impressed upon lead 101, Fig. 2 of application No. 211,950, would have to be changed from the negative polarities used in the afore-mentioned application to more positive polarities and the present invention would be arranged so that the ground connections shown would each be completed through a —50 volt battery. It will be understood that the specific voltages necessary for the satisfactory operation of the present invention may be supplied in accordance with the system with which it is to be used by anyone skilled in the art.

The main object of the present invention is to provide an electronic distributor for selecting an idle selector in succession out of a group of selectors some of which may be busy. It will be understood that the use of the invention is not limited to selectors, but is generally capable of use for selecting one of a number of any type of devices.

Another object of the present invention is the use of simplified control and counting circuits to achieve the automatic selection of an idle selector in a group of selectors.

Another object of the present invention is the use of special resistor elements in conjunction with rectifier elements to achieve novel electronic switching between the selected selector circuit and the distributor without the use of mechanical contacts.

Other objects will appear upon further perusal of the detailed description taken in conjunction with the accompanying drawings which show a preferred embodiment of the present invention.

It is anticipated that a high speed distributor capable of performing the functions now performed by rotary switches may be found very useful in future electronic switching systems used in other than the telephone art. Other uses may arise for such a distributor, for example in one electronic plan under consideration, the distributor may be employed in a manner similar to a master switch in a plunger line switch system.

The distributor circuit is based on an electronic counting chain of the type which is advanced one step per each input pulse. In the present circuit, the counting chain is driven by positive input pulses applied to the left cathodes of the counting tubes. Less driving power is required when the chain is pulsed in the manner indicated.

Figure 2:
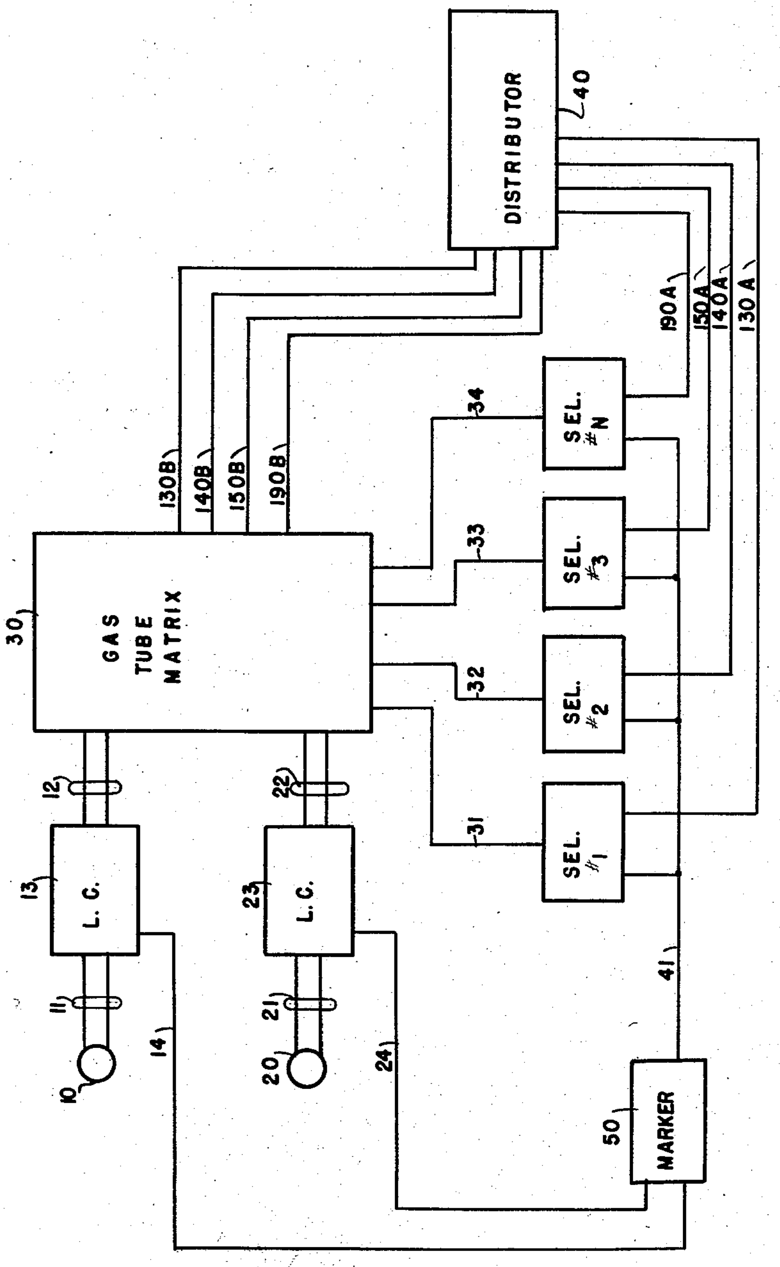
Fig. 2 shows a schematic diagram of an electronic telephone system, as described in my afore-mentioned application now Patent No. 2,769,865, and showing therein the relation of the distributor to the whole.

Referring to Fig. 2, the preferred type of telephone system is shown therein and represents the system described in my aforementioned Patent No. 2,769,865 where for the purpose of simplification, only two substations, 10 and 20 are shown, with means for interconnecting them indicated by the various blocks. A call may be initiated from the substation 10 to the substation 20 by removing the handset at station 10 thereby closing a circuit over the line 11 to operate the line circuit 13. Operation of the line circuit 13 sets up a marking corresponding to the calling line so that station 10 is indicated as busy to the various switches associated therewith, and it also conditions the gas tube matrix 30 for operation to establish a connection to a selected idle selector. Immediately thereafter, the distributor 40 is operated to select another idle selector. The connected selector is operated in response to receipt of pulses corresponding to a dialed number to interconnect the calling station 10 to the called station 20 via the gas tube matrix 30 as described in the afore-mentioned application. The function of the distributor 40 is to test in successive order the various selectors until an idle selector is found, such as Sel #1, and condition the tubes (not shown) individual to Sel #1 in the matrix 30 by applying proper operating potential to line 130B individual to that selector. The purpose of the gas tube matrix 30 is to maintain a connection between the line circuit 13 of the calling station 10 and the line circuit 23 of the called station 20 after said connection has been established by the selected selector, such as Sel #1.

Figure 1:
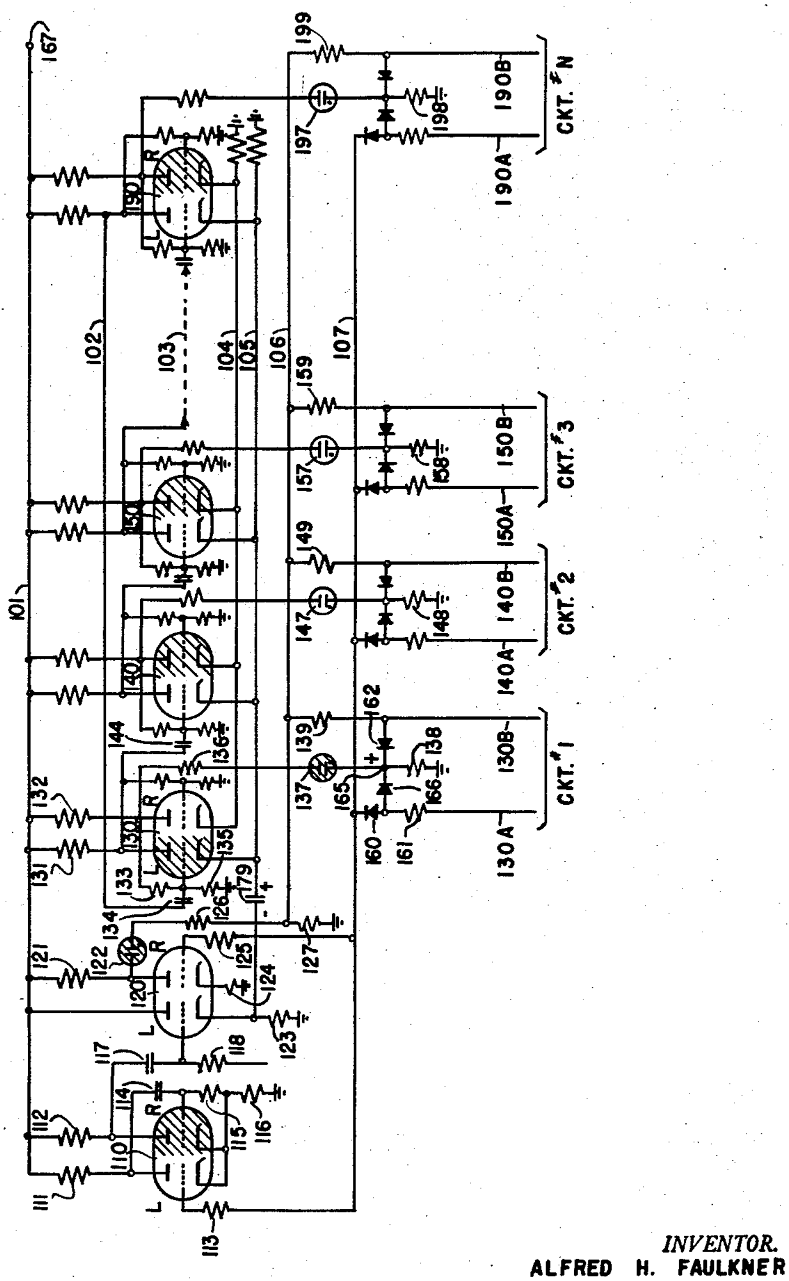
Fig. 1 shows a diagram of a circuit of a distributor which is used for the purpose of controlling a plurality of selector circuits such as are used in my "Electronic Telephone System," application No. 211,950 now issued as Patent No. 2,769,865.

Referring to Fig. 1, the circuit disclosed therein contains two individual circuits: the control circuit, comprising the tubes 110 and 120 and the counting chains circuit comprising the counting tubes 130, 140, 150 . . . 190.

The distributor may have as many outlets as desired, one counting tube being required for each outlet as indicated in Fig. 1. The dashed lines, such as 103, indicate that additional counting tubes, such as tube 150, and additional selector circuits such as Sel #3, may be inserted therein depending on the size of the telephone system wherein this particular type of distributor is being used. Tube 110 is operated as a square wave oscillator which may be started and stopped by varying the voltage on the grid of the left triode of said tube. As evidenced by the illustration in Fig. 1, each tube consists of two triodes contained within one envelope. For ease in distinction in describing the operation of the distributor circuit, the left side of each triode together with its structural elements will be prefixed by L and the right side triode of each tube together with its associated elements will be prefixed by R. The L triode of tube 120 is employed as a cathode follower which functions to deliver a sharp pulse to the counting chain for each oscillation occurring within tube 110. The R triode of tube 120 is employed to cause tube 120 to act as a "squelch" tube to prevent interference with busy selector circuits passed over during the hunting operation.

A multivibrator circuit, such as that comprising the tube 110 and its associated components, operates in a conventional manner. When one triode of the pair conducts, it renders the other triode non-conductive. The R triode of tube 110 is rendered non-conductive by the operation of the L triode when a positive potential is impressed on the L grid therein. Non-conduction of R triode of tube 110 will cause the L triode of tube 120 to operate and thereby generate a short positive pulse across the cathode resistor 123. Each pulse generated across the resistor 123 advances the counting chain circuit one step.

The distributor circuit is connected to the various circuits associated with their respective selectors by means of the mark lead 106 and the control lead 107, and each connection is controlled by a gate circuit individual to each of the various circuits. If a tested selector is idle, the R triode of tube 120 is extinguished and the neon lamp 122 is illuminated as a positive potential is caused to be impressed thereacross and to be present on the mark lead 106 which connects to the junction end of the resistor 127. It is this positive potential existing on the mark lead 106 which is impressed upon the "B" lead of the selected circuit and the grids of the gas tubes associated therewith, for example the line 140B of the Sel #2, to effect the functioning of the matrix 30. The control lead 107 serves to impress a ground or positive potential forwarded from a busy selector over a lead, such as lead 130A during a testing period, upon the L grid of tube 110 and the R grid of tube 120 to cause the control circuit to operate to advance the counting circuit to the next succeeding selector circuit.

The rectifiers, such as 160, 162 and 166 are used in conjunction with a neon lamp, such as 137 to effect a connection between the selector circuit, such as Sel #1, to the mark lead 106 and the control lead 107. When the R triode of any of the counting tubes, such as 130, is conducting, the neon lamp associated therewith, such as 137, is not ionized. Under such a condition, any potential existing on lines 130A and 130B is shunted therefrom via the rectifiers 162 and 166 through the resistor 138 to ground. Whenever the L triode of the tube 130 is conducting, the R triode of tube 130 is extinguished, and neon lamp 137 is ionized. The flow of electrons from ground through the resistor 138 is of a particular magnitude so that the potential appearing at the point 165, due to the voltage drop across the resistor 138, is sufficient to prevent the potentials of similar value present on any of the leads 130A or 130B from being shunted to the ground through the resistor 138 and the rectifiers associated therewith. Therefore a busy potential existing on lead 130A is effective to cause the control circuit to advance the counting chain. If the potential on the "A" lead is negative with respective to the potential at point 165, when the R triode of tube 130 is extinguished, the control circuit is rendered ineffective to advance the counting circuit, and Sel #1 is established as the idle selector. The R triode of the tube 120 is extinguished, and a positive potential is forwarded over lead 130B as the potential at point 165 prevents rectifier 162 from shunting it. This ingenious method of connecting the selector circuit to the leads in the distributor allows the connection to be made without the use of mechanical contacts. The rectifiers employed in the various gate circuits may be of any one of the various types of rectifiers including crystal diodes.

The method of operation (originally disclosed in my former application No. 211,950) will now be described for establishing a telephone connection from the calling substation 10 to the called substation 20. Removing the handset at the substation 10 will close a loop circuit over the line 11 to the line circuit 13, in the usual manner, causing the components found therein to send operating potentials over the line 12 to the gas tube matrix 30 causing one of the tubes in the matrix to be conditioned for establishing a connection between the calling substation and the selected idle selector's connected thereto after which the selector may be actuated to establish a connection to the called line as described in the aforementioned application. A ground potential is applied from the line circuit 13 over the line 14 to busy line circuit 13 to the marker 50. Application of this ground potential indicates that the line 12 is busy and precludes it from being seized by an incoming call as described in the aforementioned application. To summarize then a connection between the substations 10 and 20 is completed through the matrix 30. The distributor 40 tests the selectors in successive order and preselects an idle selector, such as selector Sel #1, and conditions the tubes in the matrix 30 associated with the preselected idle selector such as Sel #1, by applying a proper operating potential over the line 130B associated therewith.

When the calling party dials the two digit number of the called party, the impulses are transmitted over the previously described seized circuit in a manner well known in the telephone art to operate the counting chain circuits found within the preselected selector. The tubes in the selector counting circuits which become energized numerically corresponding to the dialed digits are used to impress proper operating potentials on the marker and the matrix.

Individual connecting leads denoted by the suffix "B" extend from the distributor 40 to the corresponding tubes in the matrix while individual connecting leads denoted by a suffix letter "A" extend from individually corresponding selectors to the distributor as shown in Fig. 2. The potential on the "A" leads determine whether the selectors are free or in use. When a selector is busy, its associated "A" lead is positive with respect to the cathode potential on the L triode of tube 110 and the cathode potential of the R triode of tube 120. The potential on any particular "A" lead is prevented from affecting tubes 110 and 120 except when the counting chain is advanced to a position corresponding to that particular lead, as the potential is normally shunted by a rectifier such as 166 and a resistor such as 138. The "B" leads are normally at a low potential when the distributor is searching as the R triode of tube 120 is fired. When an idle selector circuit is selected by the distributor 40, a positive potential is impressed on the corresponding "B" lead by the control circuit within the distributor to prepare the tubes of the matrix associated therewith and thereby preselect the selector. The R triode of tube 120 is extinguished when the idle selector is found to impress the positive potential on the "B" leads, however only the selected selector's "B" lead is affected, as all the others are effectively shunted by a rectifier resistor combination such as 162 and 138.

When the circuit is in the condition indicated (cross-hatched triodes), the distributor 40 is standing on CKT #1 that is, the R triodes of the tubes 110, 140 150 . . . 190, and the L triode of tube 130 are in the state of conduction. Counting tube 130 is in a reversed state of energization with respect to the other counting tubes 140, 150 . . . 190. The neon lamp 137 is ionized as a result of the reversed state of the tube 130 forming a conduction path from ground through the resistor 138, the neon lamp 137, the resistor 136, the resistor 132, and line 101 to the source of positive potential at terminal 167. The flow of electrons over the path hereinbefore described causes the upper end of the resistor 138, namely point 165, to have a positve potential. The voltage drop across the resistor 138 renders the rectifiers 162 and 166 non-conductive thus in effect opening the respective gate circuits and connecting leads 130A and 130B to the common control and mark leads, 107 and 106 respectively. All of the other neon lamps 147, 157 . . . 197 associated with the counting tubes 140, 150 . . . 190 are not ionized, hence leads 140A and 140B, 150A and 150B . . . 190A and 190B are effectively shunted to ground through their respective rectifier elements and therefore dis-associated from the control lead 107 and the mark lead 106.

If during the testing operation Sel #1 is found to be already in use, its "A" lead has a positive potential with respect to the cathode potentials of the cathode of the L and R triodes respectively of tubes 110 and 120 impressed thereon (Fig. 2) therefore causing the L grid of tube 110 and the R grid of tube 120 to become positive over the path extending from line 130A, resistor 161, rectifier 160, line 107 and to the L grid of tube 110 via the resistor 113 and to the R grid of tube 120 via resistor 125. The presence of positive potential on the R grid of tube 120 will cause the R triode of said tube to conduct. This will cause a voltage drop across the plate resistor 121 decreasing thereby the voltage present on the R plate of said tube so that, as a result of the decrease in voltage, the neon tube 122 will become de-ionized causing the mark lead 106 to fall to ground potential via the resistor 127.

The L triode of tube 110 is normally cut-off by the voltage drop in the common cathode resistor 116. When the potential on the L grid of the tube 110 is raised as a result of the positive potential impressed upon the control lead 107, conduction will be initiated in the L triode of said tube. As a result of the conduction in the L triode of tube 110, a decrease of potential occurring on the L plate of said tube is impressed via the capacitor 114 upon the R grid of said tube causing the R grid to be driven negative. The current in the R triode is thus decreased, causing the cathode voltage to drop which in turn causes a further increase in the plate current in the L triode because of the diminished voltage drop across the common cathode resistor 116. As a result of the above regenerative action, the potential on the R plate rises very abruptly and the R grid is driven considerably beyond cut-off for a time interval dependent on the time constant of the coupling circuit comprising the capacitor 114 and the resistors 115 and 116. The R plate of tube 110 is coupled to the L grid of tube 120 through an R-C circuit comprising capacitor 117 and resistor 118. This R-C circuit has a very short time constant so that a sharp positive pulse appears on the L grid of tube 120. The L triode of tube 120 is biased beyond cut-off so that only the top portion of the pulse is reproduced in the cathode circuit of said triode. This pulse is used to advance the counting chain from one tube to a succeeding tube in the series of tubes 130 . . . 190. The pulse appearing across the cathode resistor 123 is coupled by means of the capacitor 179 to the L cathodes of all the tubes in the counting circuit.

As a result of the conduction of the L triode of tube 130, the capacitor 179 has impressed thereon a certain voltage which added to the voltage of the pulse appearing across the cathode resistor 123 is sufficient to drive the L cathode of tube 130 more positive thereby causing the potential existing between the cathode and the plate of said triode to decrease below cut-off value thereby causing the L triode to cease conduction. Since the L triode of tube 130 does not conduct any more, the neon lamp 137 will be open circuited thereby becoming extinguished; and the rising voltage on the L plate of said tube is impressed across the capacitor 144 onto the L grid of the succeeding counting tube 140. The rise of positive potential on the L grid of tube 140 will cause the L triode to commence conduction with the result that the R triode of said tube ceases to conduct. The rise in plate potential of the R triode of tube 140 ionizes tube 147 and renders the junction of resistor 148 and the associated rectifiers positive with respect to ground.

If circuit, Sel #2, is free, no operating potential is present on line 140A and the control lead 107 when tube 140 is reversed (L triode operating) and the tube 130 is restored to normal (R triode operating). In this case, the R triode of tube 110 gradually returns to the full conduction state as soon as the voltage in the R grid returns to normal, that is, as soon as the voltage impressed during conduction of L triode across the capacitor 114 leaks off and the counting chain operation is terminated at this point to select Sel #2. As the R triode of tube 120 is now also non-conductive a positive potential is impressed on lead 106, which is shunted to ground over each rectifier resistor combination associated with the "B" leads except the rectifier resistor combination associated with lead 140B as resistor 148 has a positive potential at its upper end.

If the circuit, Sel #2, is busy, i. e. a positive potential with respect to the L and R cathodes respectively of tubes 110 and 120 is present on lead 140A and the junction of resistor 148 and the associated rectifiers is at a positive potential due to the extinction of the R triode of tube 140, the control lead 107 is positive, conduction is again initiated in the R triode of tube 110. In this situation, when CKT #2 is busy, the operating potential, which is present on the lead 140A is impressed on the control lead 107, and effects the operation of the tubes 110 and 120 in the manner previously described. Under the present conditions, the increasing current in the R triode of tube 110 causes a greater cathode voltage drop thereby causing the plate current in the L triode to decrease in regenerative action making the R triode to become fully conductive very abruptly. As soon as the charge on the coupling capacitor 114 has changed sufficiently, the action is reversed and the R triode is again abruptly cut off. The extinguishing of the R triode of tube 110 causes a pulse to be impressed upon the L grid of tube 120 in the manner previously described, to cause the latter to conduct. Conduction of the L triode of tube 120 will create a pulse across the cathode resistor 123 which is used to initiate conduction in the next succeeding tube in the counting chain, namely tube 150. As a result, the counting chain is advanced from the counting tube 140 to the counting tube 150. This action is repeated until a free selector circuit is found. Assuming that the circuit Sel #3 is free, that is, no positive potential is present on the lead 150A, the plate current in the R triode of tube 120 decreases because of non-existence of positive potential on the control lead 107 to such an extent that for practical purposes the conduction can be considered as non-existent. The presence of the high positive potential on the R plate of tube 120 enables the neon lamp 122 to become ionized. The mark lead 106 which is connected to the neon lamp circuit, is rendered positive causing this positive potential to be impressed upon the lead 150B of the selected circuit, Sel #3, via the resistor 159. The potential impressed upon the lead 150B is transmitted to the gas tube matrix 30 (Fig. 2) to enable it to effect a connection between the calling station 10 and the called station 20 via the line circuit 13, gas tube matrix 30, and line circuit 23.

It should be noted that the neon lamps are not essential to the operation of the circuit disclosed in Fig. 1. They merely serve as convenient visual indicators of the distributor position and also provide a greater voltage change across the shunting resistors, such as resistor 138 than would be obtained if the neon lamps were replaced by ordinary resistors.

If desired, the Mark circuit may be employed to convey speech signals to the selected circuit rather than a mere marking potential. Additional channels may be added by using an additional series of rectifiers and resistors in the same manner as the rectifiers 160, 162 and 166 are used in conjunction with resistors 138 and 161. If many channels are required, cathode followers may be employed to develop the required unblocking potential across the shunting resistors, such as 138, in response to reversal of the corresponding counting tubes. By using cathode followers, the value of the shunting resistors could be greatly reduced thereby minimizing crosstalk between the channels and providing more complete rotation of the Control and Mark leads from the non-selected "A" and "B" leads.

While there has been described what is at present considered to be the preferred embodiment of the invention it will be understood that various modifications may be made herein and it is intended to cover in the appended claims all such modifications as fall within the true spirit and scope of the invention.

What is claimed is:

1. In a communication system of the type employing an electronic valve matrix for extending a connection from a calling line to an idle selector among a group of selectors and wherein a test circuit is provided for each selector and wherein means are provided for placing one potential on a test circuit if its associated selector is idle and another potential on a test circuit if its associated selector is busy, the improvement comprising a control circuit commonly connected to all the test circuits, a counting circuit controlled by said control circuit to successively select each of said test circuits, means individually associated with each test circuit for preventing a potential on its associated test circuit from being forwarded to said control circuit unless said counting circuit has selected the test circuit, said means arranged to cause said other potential on its associated one test circuit to render said control circuit effective to control said counting circuit to select another test circuit if said counting circuit had selected said associated one test circuit, a last circuit for each selector connected in common to said control circuit, and means individually associated with each test circuit for enabling only the associated last circuit to prepare a valve in said matrix to enable a connection to be established through said matrix from a calling line to an idle selector if said counting circuit has selected a test circuit having said one potential thereon.

2. In a communication system of the type employing an electronic valve matrix for extending a connection from a calling line to an idle selector among a group of selectors some of which may be idle and some of which may be busy, the improvement comprising a test circuit for each selector, a control circuit commonly connected to all the test circuits, a counting circuit controlled by said control circuit to successively select each of said test circuits, means for placing a potential on each test circuit associated with a busy selector, other means individually associated with each test circuit for preventing a potential on its associated test circuit from being forwarded to said control circuit unless said counting circuit has selected the associated test circuit, said other means arranged to cause said potential on its associated test circuit to be forwarded to said control circuit if said counting circuit has selected its associated test circuit, said potential effective to cause said control circuit to control said counting circuit to select another test circuit, and a last circuit for each selector commonly connected to said control circuit for preparing a valve in said matrix to enable a connection to be established through said matrix from a calling line to an idle selector if said counting circuit has selected its associated test circuit and said associated test circuit does not have said potential thereon.

3. A communication system wherein a number of selectors are provided for establishing connections and wherein each selector has a test circuit conditioned in one manner if its associated selector is idle and conditioned in another manner if its associated selector is busy, the improvement comprising a control circuit commonly connected to each test circuit, a counting circuit for selecting one of said test circuits, means individually associated with each test circuit and controlled by said counting circuit for normally preventing a test circuit conditioned in said other manner from affecting said common circuit, said means effective if said counting circuit has selected one of said test circuits conditioned in said other manner for causing said control circuit to control said counting circuit to select another test circuit.

4. An arrangement for use in selecting one of a number of devices some of which may be idle and some of which may be busy and which each has an individually associated unidirectional test circuit having one potential thereon if its associated device is idle and another potential thereon if its associated device is busy, comprising a circuit connected in common to each unidirectional test circuit, a unidirectional circuit for each test circuit for controlling the application of a potential on said test circuit to said common circuit, and last means individually associated with each unidirectional control circuit and its associated test circuit and controlled by said common circuit for enabling its associated unidirectional test circuit to apply said other potential to said common circuit to thereby cause said common circuit to control another of said last means, each of said unidirectional test circuits preventing said other potential applied to said common circuit from any other test circuit from being transmitted from said common circuit.

5. In an arrangement such as described in claim 4, a last circuit for each device connected to said common circuit, and a last unidirectional control circuit individually associated with each of said last circuits and controlled by the associated one of said last means at the time said last means is controlled by said common circuit if its associated test circuit has said one potential thereon for enabling said common means to control the associated device, each of said last unidirectional circuits preventing said common circuit from controlling its associated device at other times.

6. An electronic distributor for use in a selecting arrangement comprising an electronic counting chain, an electronic control circuit for controlling said counting chain, a plurality of test circuits arranged to be successively selected by said counting chain, each test circuit commonly connected to said control circuit, a control means for each test circuit to enable a particular potential impressed on its associated test circuit to be transmitted to said control circuit if said counting chain has selected its associated test circuit to thereby cause said electronic control circuit to control said counting circuit to select another test circuit.

7. In a distributor such as described in claim 6, another circuit associated with each test circuit, each other circuit commonly connected to said electronic control circuit, each of said control means preventing a potential from being produced on its associated other circuit, and means including said control means for producing a potential on one of said other circuits if the counting circuit has selected the associated test circuit and if said particular potential is not impressed on its associated test circuit.

8. An electronic switching network wherein a signal source is arranged to provide a particular potential to at least one test circuit of a plurality of test circuits comprising a line commonly connected to said test circuits, a shunting arrangement comprising a resistor rectifier network associated with each test circuit and normally arranged to shunt said particular potential from its associated test circuit to thereby prevent said potential from appearing on said line, and control means associated with each network, one of said control means effective to prevent its associated network from shunting said potential from its associated test circuit to thereby apply said potential to said line, another of said control means associated with another network and test circuit operated in response to the application of said potential to said line to render its associated network ineffective to shunt said particular potential from its associated test circuit if said potential is provided thereon.

9. An electronic switching arrangement comprising a plurality of resistor and rectifier elements forming a number of networks, a plurality of test circuits, each of said test circuits connected to a common line and individually associated with one of said networks, each network normally shunting its associated test circuit to thereby prevent current flow between its associated test circuit and said line, control means associated with each network, means for selecting any one of said test circuits, one of said control means operated in response to the selection of its associated test circuit by said selecting means to prevent the associated network from shunting its associated test circuit and thereby enabling current flow between the test circuit associated therewith and the line.

10. In an arrangement adapted for use in a communication system wherein a number of devices are individually available for use in extending a connection, the improvement comprising an individual test circuit for each device having one potential thereon if its associated device is being used for extending a connection and having another potential thereon if its associated device is idle, a circuit connected in common to each test circuit, a gate circuit individually associated with each test circuit for controlling the transmission of a potential from its associated test circuit to said common circuit, and counting means controlled by said common circuit to select one of said test circuits, said counting means controlling the gate circuit associated with one selected test circuit for permitting the transmission of said one potential thereon to said common circuit whereby said counting means is controlled to select another test circuit.

11. An arrangement such as claimed in claim 10, in which said counting means is arranged to maintain control of the gate circuit of said one selected test circuit if said other potential appear thereon to permit transmission of said one potential therefrom when said one potential appears thereon.

12. In an arrangement such as claimed in claim 10, a control circuit for each of said devices, a common connection therefor, and means controlled by said counting means for permitting the transmission of a potential to one control circuit if said counting means has selected its associated test circuit and said selected test circuit has said other potential thereon.

13. An arrangement adapted for use in a communication system wherein a plurality of devices are individually available for use in extending a connection, the improvement comprising a test circuit individual to each device and having a potential thereon corresponding to the condition of its associated device, a circuit connected in common to the test circuits, counting means controlled by said common circuit for selecting one of said test circuits, and a gate circuit individually associated with each test circuit and controlled by said counting means on selection of its associated test circuit for permitting the condition of its associated test circuit to control said common circuit in a manner corresponding to the condition of its associated device.

References Cited in the file of this patent

UNITED STATES PATENTS

| | | |
|---|---|---|
| 1,924,661 | Stehlik | Aug. 29, 1933 |
| 2,300,316 | Raymond | Oct. 27, 1942 |
| 2,595,232 | Dimond | May 6, 1952 |
| 2,644,041 | Mercer | June 30, 1953 |
| 2,668,194 | Kessler et al. | Feb. 2, 1954 |